US008800597B2

(12) United States Patent
Colby et al.

(10) Patent No.: US 8,800,597 B2
(45) Date of Patent: Aug. 12, 2014

(54) FINE CONTROL GAS VALVE

(75) Inventors: Douglas D. Colby, Clarkston, MI (US); Louie Xu Liu, Troy, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 649 days.

(21) Appl. No.: 13/088,000

(22) Filed: Apr. 15, 2011

(65) Prior Publication Data

US 2012/0261601 A1 Oct. 18, 2012

(51) Int. Cl.
*F16K 1/54* (2006.01)
*F16K 31/50* (2006.01)
*F16K 37/00* (2006.01)

(52) U.S. Cl.
USPC ............................ 137/556; 251/121; 251/152

(58) Field of Classification Search
CPC .............. F16K 1/06; F16K 1/38; F16K 1/54; F16K 3/32; F16K 3/246; F16K 3/267; F16K 31/50; F16K 31/504; F16K 37/0008; F16K 37/0016
USPC ............ 137/556, 556.3, 556.6; 251/120, 121, 251/122, 152
See application file for complete search history.

(56) References Cited

U.S. PATENT DOCUMENTS

| | | | | |
|---|---|---|---|---|
| 205,553 A | * | 7/1878 | Hutchinson | 251/152 |
| 1,223,326 A | * | 4/1917 | Marsh | 251/122 |
| 1,310,954 A | * | 7/1919 | Muller | 137/556 |
| 1,698,826 A | * | 1/1929 | Shaffer | 137/556.3 |
| 2,234,052 A | * | 3/1941 | Luenz | 137/556.3 |
| 2,614,795 A | * | 10/1952 | Allen | 251/122 |
| 3,070,116 A | * | 12/1962 | Noland et al. | 251/357 |
| 3,085,592 A | * | 4/1963 | Zajac et al. | 137/556 |
| 3,098,637 A | * | 7/1963 | Baustian | 251/122 |
| 4,047,695 A | | 9/1977 | Cleveland et al. | |
| 4,417,601 A | * | 11/1983 | Bennett | 137/556.6 |
| 4,601,310 A | * | 7/1986 | Phillips | 137/556 |
| 4,638,833 A | | 1/1987 | Wolcott, II | |
| 5,156,188 A | * | 10/1992 | Wakita et al. | 251/121 |
| 5,393,035 A | | 2/1995 | Steele | |
| 5,544,855 A | | 8/1996 | Henken et al. | |
| 6,609,697 B2 | * | 8/2003 | Gsteu | 251/121 |

FOREIGN PATENT DOCUMENTS

EP    1 092 834 A1    4/2001

* cited by examiner

*Primary Examiner* — John Rivell
(74) *Attorney, Agent, or Firm* — Harness, Dickey & Pierce, P.L.C.

(57) ABSTRACT

A fine control gas valve includes a tee having opposed first and second tee runs co-axially aligned on a longitudinal axis, and a tee branch. A valve assembly is partially received in and connected to the first tee run having a valve disc connected to a drive screw longitudinally moved by drive screw axial rotation. The valve disc includes a first slot on the valve disc having a first end and a wider second end, and a second disc slot as a mirror image of the first disc slot oppositely positioned about the valve disc. A pipe in the second tee run has a first portion of a pipe end face/seat surface in direct contact with a second tee run shoulder. The valve disc when contacting a second portion of the pipe end face/seat surface defines a valve closed condition. The first and second portions are co-planar to each other.

27 Claims, 8 Drawing Sheets

FINE CONTROL GAS VALVE

FIELD

The present disclosure relates to gas flow control valves used in both pressurized and vacuum applications.

BACKGROUND

This section provides background information related to the present disclosure which is not necessarily prior art.

Gate and globe valves used for controlling flow of fluids in a gaseous state are typically functional only for on-off control of flow because they do not permit fine flow control of compressible fluids and commonly provide little control of flow immediately upon opening of the valve disc. Gas control valves used for throttling flow commonly have elongated valve discs typically in a conical or tapering shape to permit incremental changes in flow rate. These valves are acceptable for controlling flow at mid and high flow ranges, but may not provide acceptable flow control immediately upon opening the valve disc because the geometry of the valve disc is constant and may therefore permit spiked flow rates at low inlet pressure. Known fine control or throttling valve designs are also commonly created from cast or forged body components, include finely machined ports and valve discs to achieve fine flow control, and are therefore expensive to tool and to construct.

SUMMARY

This section provides a general summary of the disclosure, and is not a comprehensive disclosure of its full scope or all of its features.

According to several embodiments of the present disclosure, a fine control gas valve includes a tee having opposed first and second tee runs co-axially aligned on a longitudinal axis, and a tee branch oriented perpendicular to the longitudinal axis. A valve assembly is partially received in and is connected to the first tee run. The valve assembly has a valve disc connected to a drive screw longitudinally moved by axial rotation of the drive screw. A pipe received in the second tee run has a first portion of a pipe end face/seat surface in direct contact with a shoulder created in a wall of the second tee run and extending inwardly from the wall. The valve disc when contacting a second portion of the pipe end face/seat surface defines a valve closed condition. The first and second portions of the pipe end face/seat surface are co-planar to each other.

According to other embodiments, a fine control gas valve includes a tee having opposed first and second tee runs co-axially aligned on a longitudinally axis, and a tee branch oriented perpendicular to the longitudinal axis. A valve assembly is partially received in and connected to the first tee run. The valve assembly has a valve disc connected to a drive screw longitudinally moved by axial rotation of the drive screw. The valve disc includes a disc columnar portion oriented perpendicular to a disc flange. A disc curved portion tangentially extends from the disc columnar portion and is oppositely directed from the disc flange. A first disc slot has a first end positioned in the disc columnar portion and extending to a second end positioned in the disc curved portion.

According to further embodiments, a fine control gas valve includes a tee having opposed first and second tee runs co-axially aligned on a longitudinally axis, and a tee branch oriented perpendicular to the longitudinal axis. A valve assembly is partially received in and is connected to the first tee run. The valve assembly has a valve disc connected to a drive screw longitudinally moved by axial rotation of the drive screw. The valve disc includes a first slot created on the valve disc having a first end and a second end wider than the first end. A second disc slot is created on the valve disc in a mirror image of the first disc slot and is oppositely positioned about the valve disc with respect to the first disc slot. A pipe received in the second tee run has a first portion of a pipe end face/seat surface in direct contact with a shoulder created in a wall of the second tee run. The valve disc when contacting a second portion of the pipe end face/seat surface defines a valve closed condition. The first and second portions of the pipe end face/seat surface are co-planar to each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
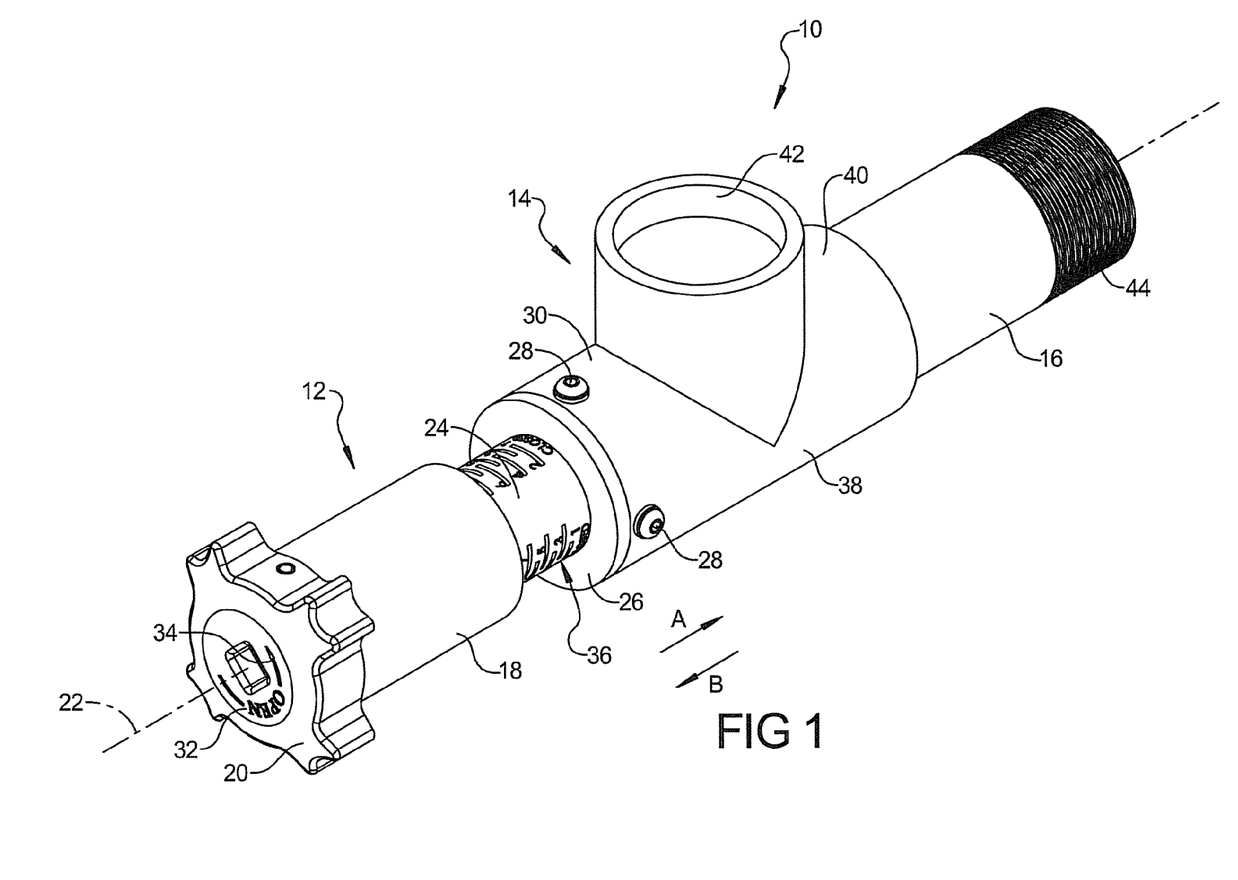
FIG. 1 is a top perspective view of a fine control gas valve of the present disclosure.

Referring to FIG. 1, a fine control gas valve 10 includes a valve assembly 12 connected to a tee 14. Tee 14 can be a commercially available polymeric material tee made for example from industry standard schedule 80 polyvinyl chloride (PVC) or chlorinated polyvinyl chloride (CPVC) material tees. An inlet pipe 16 is oppositely disposed about tee 14 with respect to valve assembly 12 which is connected to a source of fluid such as a gas, including methane, air, carbon monoxide, carbon dioxide, and the like.

According to several embodiments, valve assembly 12 includes a tubular-shaped cover sleeve 18 of a polymeric material having a hand operator 20 connected to cover sleeve 18 such that rotation of hand operator 20 also co-axially rotates cover sleeve 18 with respect to a valve longitudinal axis 22. Hand operator 20 is connected to a drive screw which is shown and described in detail in reference to FIG. 3, therefore rotation of hand operator 20 and cover sleeve 18 also longitudinally displaces cover sleeve 18 in a valve closing direction "A" or a valve opening direction "B". This longitudinal displacement acts to either cover or expose an indicator sleeve 24 which is fixedly connected to a flanged connector 26. Flanged connector 26 is in turn fixedly (non-rotatably) connected to tee 14 using a plurality of connector fasteners 28 inserted through both a wall of a first tee run 30 and material of flanged connector 26 such that flanged connector 26 and indicator sleeve 24 are non-rotationally connected to first tee run 30 of tee 14. Flanged connector 26 and indicator sleeve 24 therefore do not rotate with respect to the valve longitudinal axis 22 when hand operator 20 is rotated.

To provide a visual indication of an opened/closed or intermediate position of valve assembly 12, indicator sleeve 24 includes at least one and according to several embodiments a plurality of valve position indicators 36 applied, stamped, labeled or embossed thereon. Valve position indicators 36 will be described in greater detail in reference to FIG. 2.

Tee 14 includes a tee body 38 having a second tee run 40 oppositely directed and co-axially aligned on valve longitudinal axis 22 with respect to first tee run 30. A tee branch 42 is oriented substantially perpendicular with respect to valve longitudinal axis 22. The inlet pipe 16 which is received in second tee run 40 can include a pipe connection end 44. According to several embodiments pipe connection end 44 can be a plurality of threads or similar connection means such as braising rings, O-rings, or an adhesive applied to create the connection, or the like. Fine control gas valve 10 is therefore not limited by the design or type of pipe connection end 44 provided.

Figure 2:
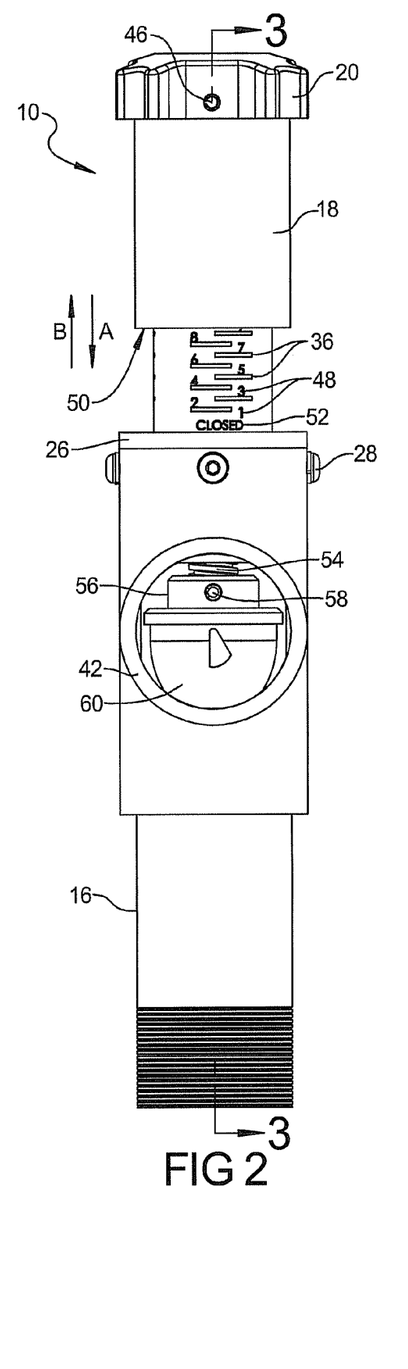
FIG. 2 is a front elevational view of the valve of FIG. 1.

Referring to FIG. 2, hand operator 20 is fixed with respect to cover sleeve 18 using an operator retention pin 46 such as a spring pin. Any axial rotation of hand operator 20 therefore also co-rotates cover sleeve 18. As cover sleeve 18 axially rotates it also axially displaces in either of the valve closing direction "A" or valve opening direction "B" such that a sleeve end face 50 of cover sleeve 18 approaches or extends away from flanged connector 26. The valve position indicator 36 can include a plurality of position indicator values 48 each corresponding to one of the valve position indicators 36, which according to several embodiments are line segments or slots. The position indicator values 48 can start for example at a value of 1 and successively increase to a maximum value, which according to several embodiments indicates a maximum extended position of cover sleeve 18 with respect to flanged connector 26 and therefore a fully open condition of fine control gas valve 10. When sleeve end face 50 either closely approaches or contacts flanged connector 26, a valve closed condition is reached which can be visually indicated using a valve closed position indicator 52. The valve closed condition does not require sleeve end face 50 to contact flanged connector 26.

According to several embodiments, each of the valve position indicators 36 and position indicator values 48 represent a 360 degree axial rotation of a drive screw 54 which is threadably connected to flanged connector 26. In other embodiments, each of the valve position indicators 36 and position indicator values 48 may represent less or more than a 360 degree axial rotation of drive screw 54 due to the thread pitch of drive screw 54. Drive screw 54 is connected to hand operator 20, and is also connected at an opposite end to a valve disc 56 using a disc connecting pin 58 such as a spring pin. Rotation of hand operator 20 therefore not only co-rotates cover sleeve 18 but further co-rotates each of drive screw 54 and valve disc 56. Axial rotation of drive screw 54 also causes longitudinal displacement of valve disc 56 based on a thread pitch of drive screw 54. As valve disc 56 displaces in the valve opening direction "B" a disc flow control surface 60 of valve disc 56 permits controlled flow of a fluid such as a gas present in inlet pipe 16 to exit through tee branch 42.

Figure 14:
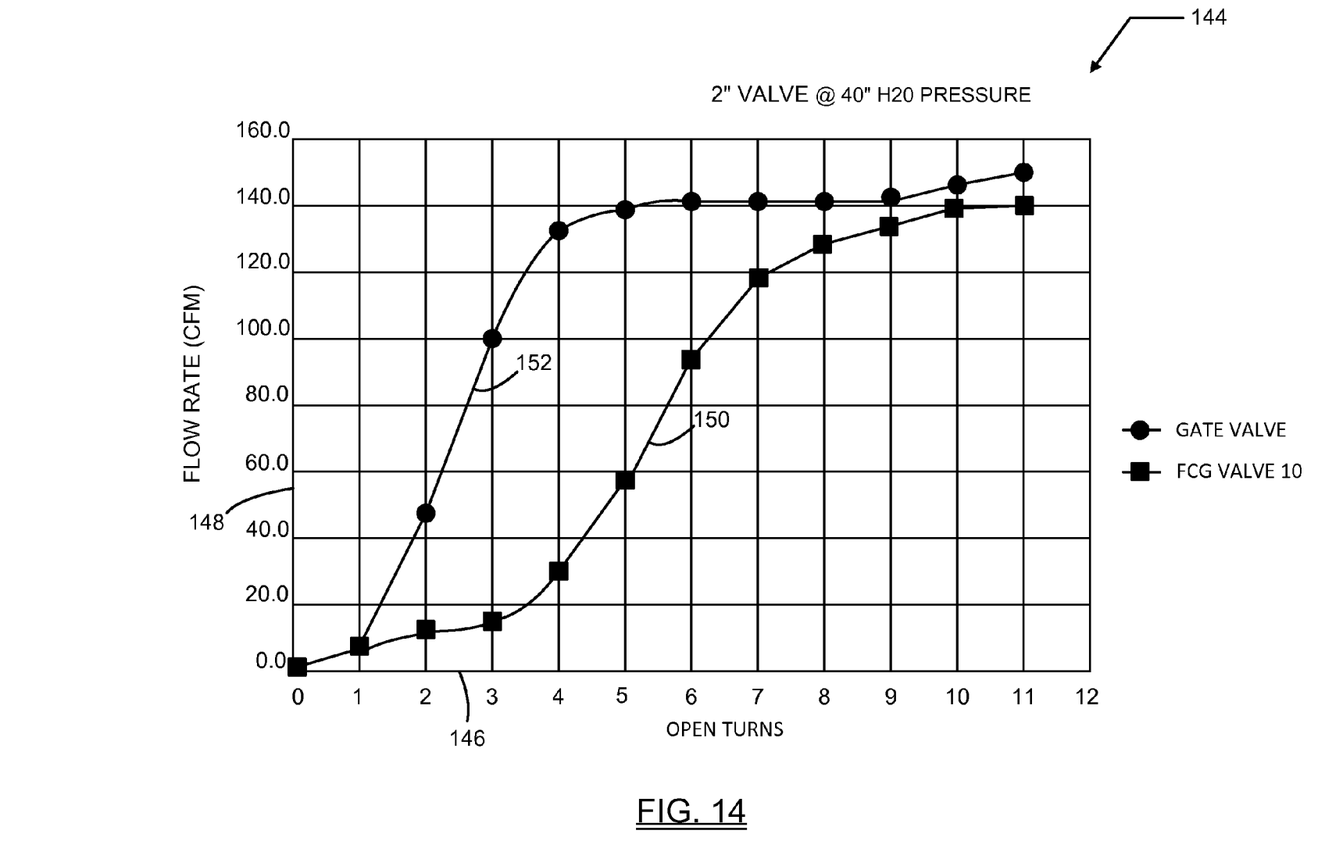
FIG. 14 is graph of open turns versus flow rate for an exemplary 2 inch fine control gas valve of the present disclosure.

According to several embodiments, drive screw 54 includes an acme thread which can include a thread pitch preselected such that each valve position indicator 36 and position indicator value 48 corresponds to a single complete revolution of drive screw 54. Valve position indicator 36 and position indicator value 48 provide visual indication to the valve operator of a quantity of turns opened or closed by rotation of hand operator 20. By use of a graph such as shown in FIG. 14, the operator can set a flow rate of fine control gas valve 10 based on the quantity of turns of hand operator 20 and drive screw 54.

Figure 3:
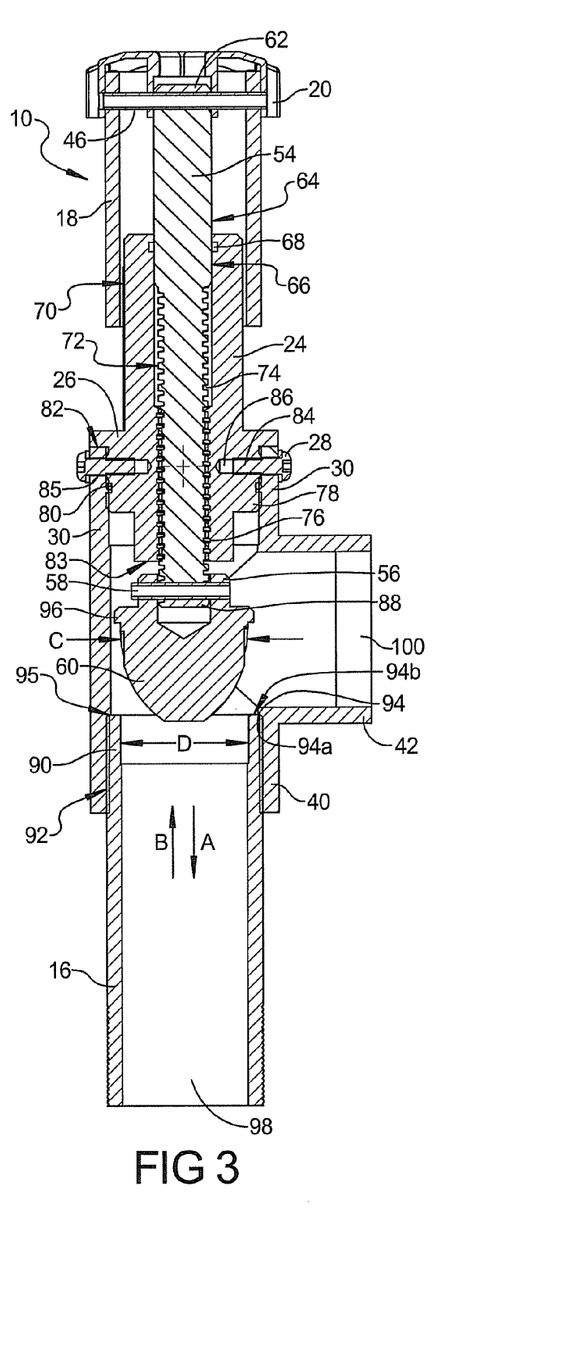
FIG. 3 is a cross sectional left side elevational view taken at section 3 of FIG. 2.

Referring to FIG. 3, operator retention pin 46 also extends through a drive screw first end 62 in addition to extending through hand operator 20 and cover sleeve 18, such that rotation of hand operator 20 co-rotates both cover sleeve 18 and drive screw 54. According to several embodiments, drive screw 54 includes a drive screw unthreaded portion 64 which is slidably received against a sleeve inner wall 66 of indicator sleeve 24. A seal member 68 such as an O-ring or D-ring can be positioned between unthreaded portion 64 of drive screw 54 and sleeve inner wall 66 of indicator sleeve 24 to provide a fluid containment boundary.

A sleeve outer wall 70 of indicator sleeve 24 is circular and is spaced from cover sleeve 18 to provide clearance for rotation of cover sleeve 18 about a perimeter of sleeve outer wall 70. Drive screw 54 further includes a threaded portion 72 which is partially positioned within a clearance bore 74 of indicator sleeve 24 and is threadably engaged with a threaded bore 76 created in a cylindrical body portion 78 of indicator sleeve 24. Clearance bore 74 therefore provides an unthreaded length for axial displacement of drive screw 54 allowing axial displacement of valve disc 56 to open and close control gas valve 10.

Cylindrical body portion 78 also includes a seal member 80 such as an O-ring or D-ring which provides a fluid boundary between a perimeter surface of cylindrical body portion 78 and the inner body wall of first tee run 30. Cylindrical body portion 78 is slidably inserted into first tee run 30 until flanged connector 26 contacts a run end face 82 of first tee run 30. A body portion end face 83 of cylindrical body portion 78 creates a positive stop for travel of valve disc 56 in the valve opening direction "B". At this time, each of the connector fasteners 28 are installed such that a threaded shank 84 of each connector fastener 28 is slidably inserted through an aperture 85 created through a wall of the first tee run 30 to threadably engage in one of a plurality of blind body apertures 86 created in cylindrical body portion 78. Fine control gas valves 10 can be used for example by connecting a vacuum line (not shown) such as a tube, hose, or pipe to tee branch 42 to draw gas in inlet pipe 16 out through tee branch 42 with valve disc 56 in the valve open condition. The position of seal members 80 and 68 are therefore selected to prevent fluid within tee 14 from escaping through any of the apertures 85 or past sleeve inner wall 66 for pressurized operation, or from atmospheric air being drawn into tee 14 through apertures 85, at run end face 82, or into clearance bore 74 if a partial vacuum is present in tee 14.

A drive screw second end 88 of drive screw 54 is connected to valve disc 56 using a disc connecting pin 58 such that axial rotation of drive screw 54 also co-rotates valve disc 56. A disc seating diameter "C" of valve disc 56 is substantially equal to or less than a sealing diameter "D" of an inlet pipe insertion portion 90 of inlet pipe 16. Inlet pipe insertion portion 90 of inlet pipe 16 is received in second tee run 40 and connected thereto using an inlet pipe connection joint 92. Inlet pipe connection joint 92 can be a threaded connection, an adhesively bonded connection, or similar mechanical joint providing a fluid-tight boundary between inlet pipe insertion portion 90 and second tee run 40.

Inlet pipe insertion portion 90 is inserted into second tee run 40 until a first portion 94a of a pipe end face/seat surface 94 contacts a shoulder 95 integrally formed in material of second tee run 40 and extending inwardly from second tee run 40 such that shoulder 95 provides a known and predetermined position for contact by pipe end face/seat surface 94. Direct contact between a disc flange 96 of valve disc 56 with a second portion 94b of pipe end face/seat surface 94 defines a closed condition of control gas valve 10. First and second portions 94a, 94b of pipe end face/seat surface 94 are coplanar with respect to each other. In the valve open condition shown, fluid at a valve inlet port 98 and inlet pipe 16 flows past the disc flow control surface 60 of valve disc 56 and exits control gas valve 10 via a valve outlet port 100 defined by tee branch 42. The valve open condition is reached by rotation of hand operator 20 causing longitudinal displacement of valve disc 56 away from contact with pipe end face/seat surface 94 in the valve opening direction "B".

Referring to FIG. 4 and again to FIG. 3, flanged connector 26 includes a first flange contact face which is oriented toward cover sleeve 18. The sleeve end face 50 of cover sleeve 18 can contact the first flange contact face 102 in the valve closed condition, or cover sleeve 18 can be sized such that sleeve end face 50 approaches but does not contact first flange contact face 102 in the valve closed condition therefore retaining visibility of valve closed position indicator 52 for observation by the operator. A parallel second flange contact face 104 is located on an opposite side of flanged connector 26 with respect to first flange contact face 102. Second flange contact face 104 directly contacts run end face 82 when cylindrical body portion 78 is fully received within first tee run 30. Cylindrical body portion 78 can further include a seal member receiving slot 106 extending around a perimeter wall of cylindrical body portion 78 receiving seal member 80. As previously noted, seal member 80 provides the fluid-tight boundary for cylindrical body portion 78, therefore an additional seal member is not required between second flange contact face 104 and run end face 82.

Figure 4:
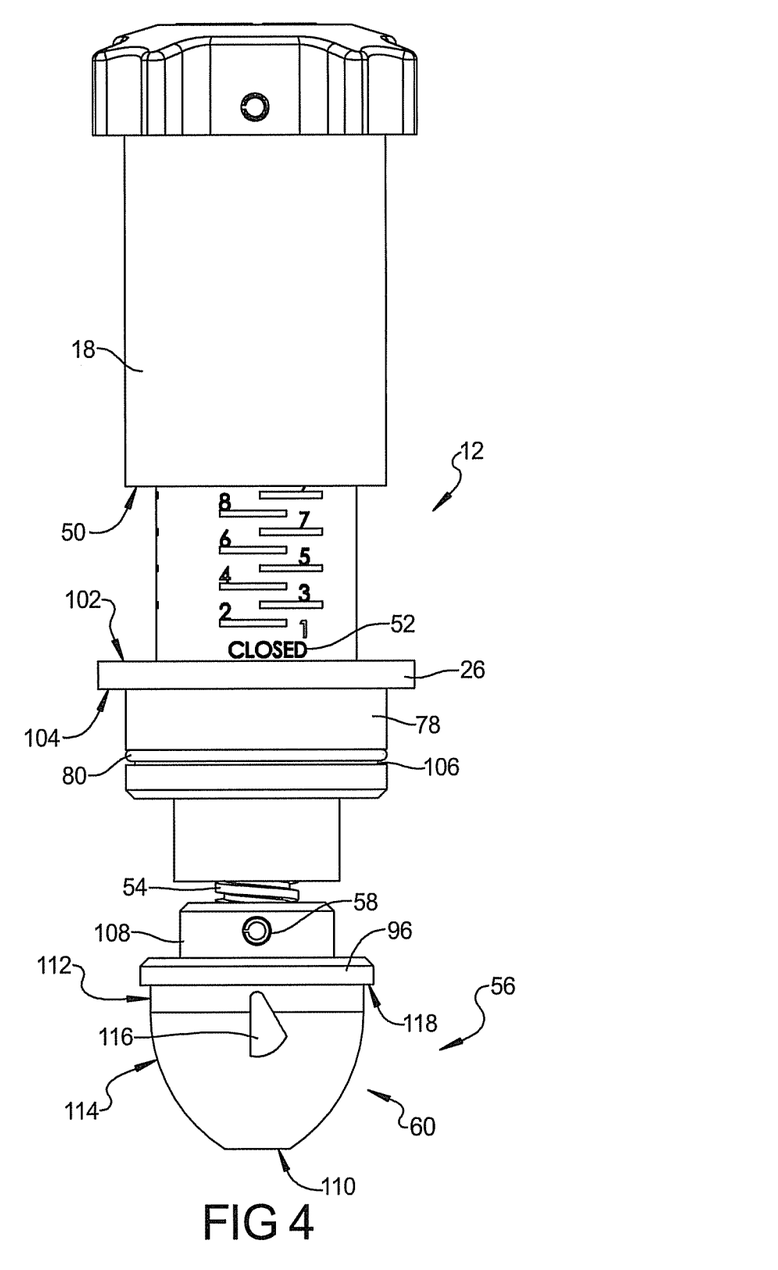
FIG. 4 is a front elevational view of a valve assembly of the present disclosure.

Valve disc 56 includes a disc connection portion 108 which directly receives the disc connecting pin 58 to connect valve disc 56 to drive screw 54. Positioned opposite to the disc connection portion 108 is a disc free end 110 which according to several embodiments is a planar surface oriented parallel to disc flange 96. The disc flow control surface 60 extends from disc flange 96 toward disc free end 110 initially defining a disc columnar portion 112 which is oriented substantially perpendicular to disc flange 96. A disc curved portion 114 tangentially transitions from disc columnar portion 112 and extends in a continuously curving, and therefore continuously reducing diameter from disc seating diameter "C" to an outer diameter of disc free end 110. An opposed pair of disc slots are created on disc flow control surface 60 having a first disc slot 116 visible in this view and a second disc slot which will be shown and described in better detail in reference to FIG. 13. The first disc slot 116 is generally pie-shaped having a narrow first end starting in the disc columnar portion 112 and a wide second end extending into the disc curved portion 114. A disc flange seat contact surface 118 is also created on a disc flow control surface 60 side of disc flange 96. With further reference to FIGS. 3 and 4, when disc flange seat contact surface 118 contacts the pipe end face/seat surface 94 the valve closed condition is defined.

Figure 5:
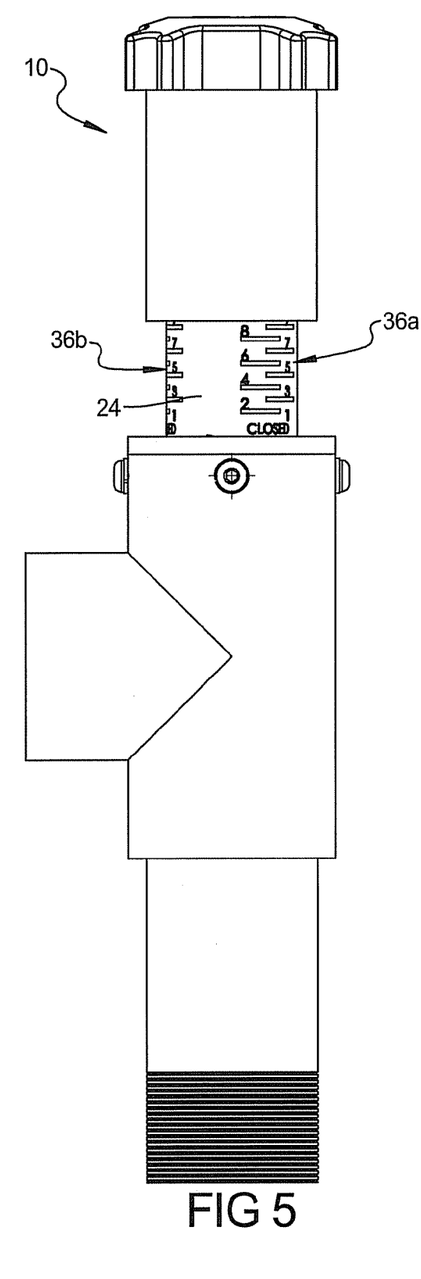
FIG. 5 is a right side elevational view of the fine control gas valve of FIG. 1.

Referring to FIG. 5, according to several embodiments the valve position indicator 36 can be repeated in multiple areas or zones about the circumference of indicator sleeve 24. For example, a first valve position indicator 36a and a second valve position indicator 36b can be oriented at approximately 120 degree intervals with respect to each other about the perimeter of indicator sleeve 24.

Figure 6:
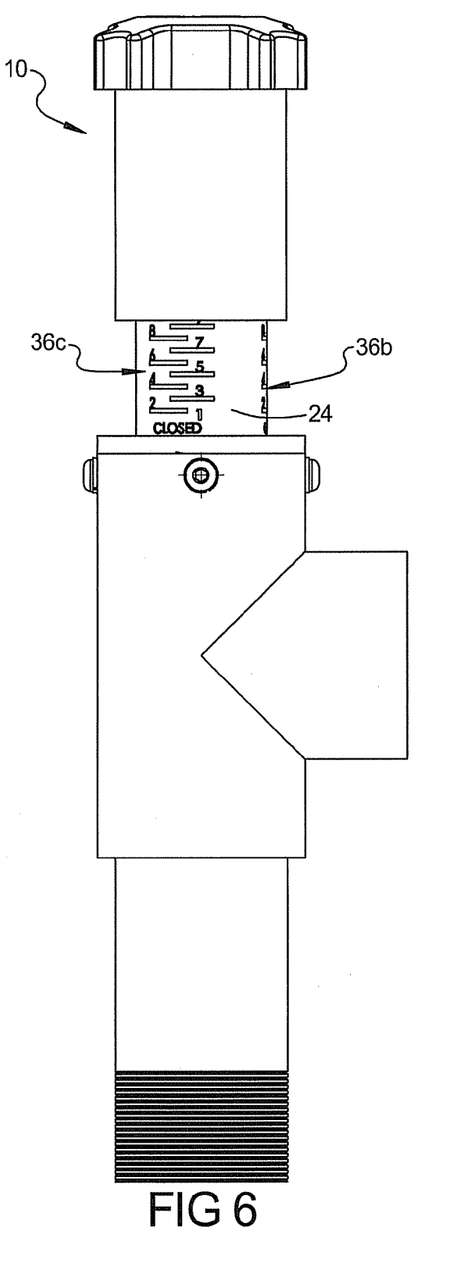
FIG. 6 is a left side elevational view of the fine control gas valve of FIG. 1.

Referring to FIG. 6 and again to FIG. 5, a third valve position indicator 36c can also be provided which is oriented at approximately 120 degrees with respect to the other valve position indicators such as second valve position indicator 36b only partially shown. One of the valve position indicators 36a, 36b, 36c will therefore be visible to an operator of control gas valve 10 regardless of the orientation of control gas valve 10 in its system installed orientation.

Figure 7:
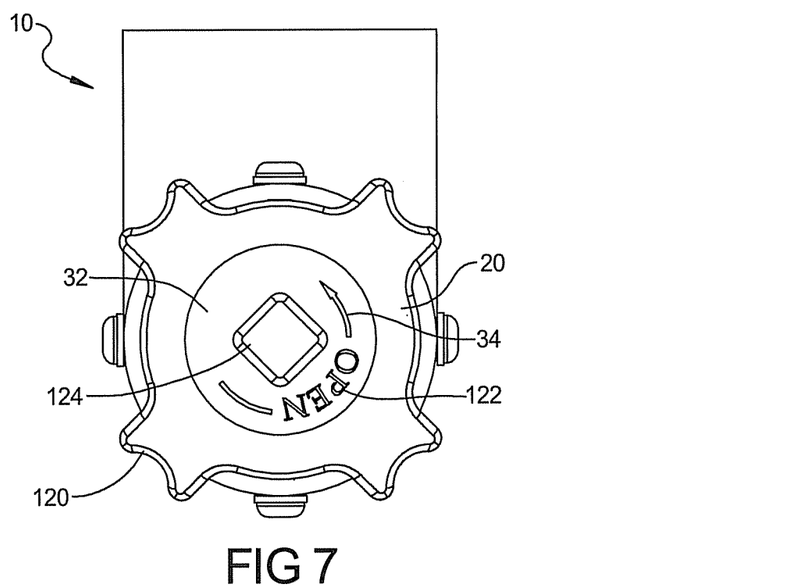
FIG. 7 is a first end elevational view of the fine control gas valve.

Referring to FIG. 7 and again to FIG. 1, hand operator 20 can include a plurality of raised grip members 120 to assist in manual rotation of hand operator 20. In addition to the directional arrow 34 provided with indicator ring 32, an open indicator 122 can also be provided signifying the rotation of hand operator 20 in the direction of directional arrow 34 operates to open flow control gas valve 10. According to several embodiments a wrench engagement slot 124 is provided in indicator ring 32 which has a square or rectangular shape. The purpose for wrench engagement slot 124 is to receive a wrench (not shown) which can be used to provide additional torque for rotation of hand operator 20, or if access is limited for hand contact with hand operator 20. The geometry or shape of wrench engagement slot 124 can also be varied from that shown and can include other geometric shapes such as a star shape, a hexagon shape, or other geometric shapes matching the geometry of tools used for this purpose including alien wrenches.

Figure 8:
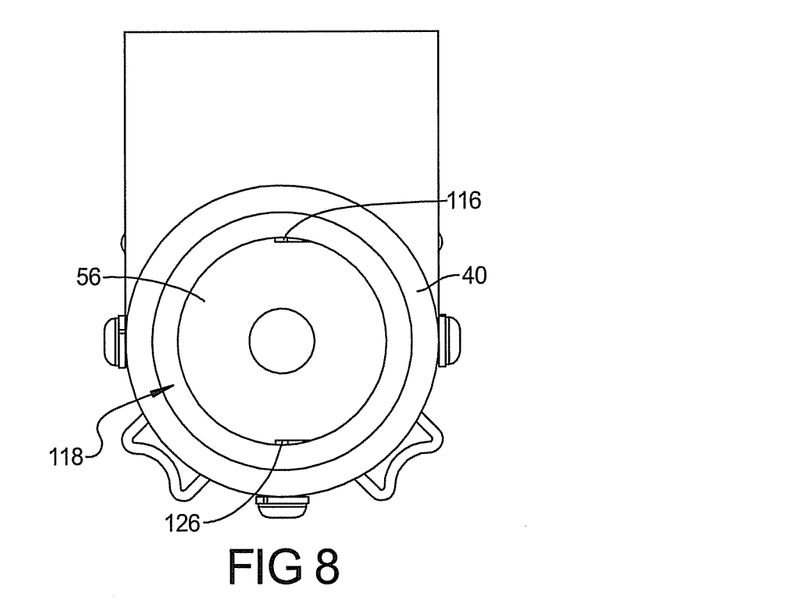
FIG. 8 is a second end elevational view of the fine control gas valve.

Referring to FIG. 8, as previously noted valve disc 56 includes two disc slots including first disc slot 116 and an oppositely positioned second disc slot 126. When fine control gas valve 10 is positioned in the valve closed condition, valve disc 56 contacts the disc flange/seat contact surface 118 such that fluid flow through either of the first or second disc slots 116, 126 is precluded. First and second disc slots 116, 126 are provided to initially increase a flow area of disc flow control surface 60 when valve disc 56 is initially moved away from contact with disc flange/seat contact surface 118. The pie-shaped flow areas of first and second disc slots 116, 126 gradually increase the fluid flow area and therefore the fluid flow rate after initially opening valve disc 56. This creates a flatter initial valve flow curve which is shown and described in better detail in reference to FIG. 14.

Figure 9:
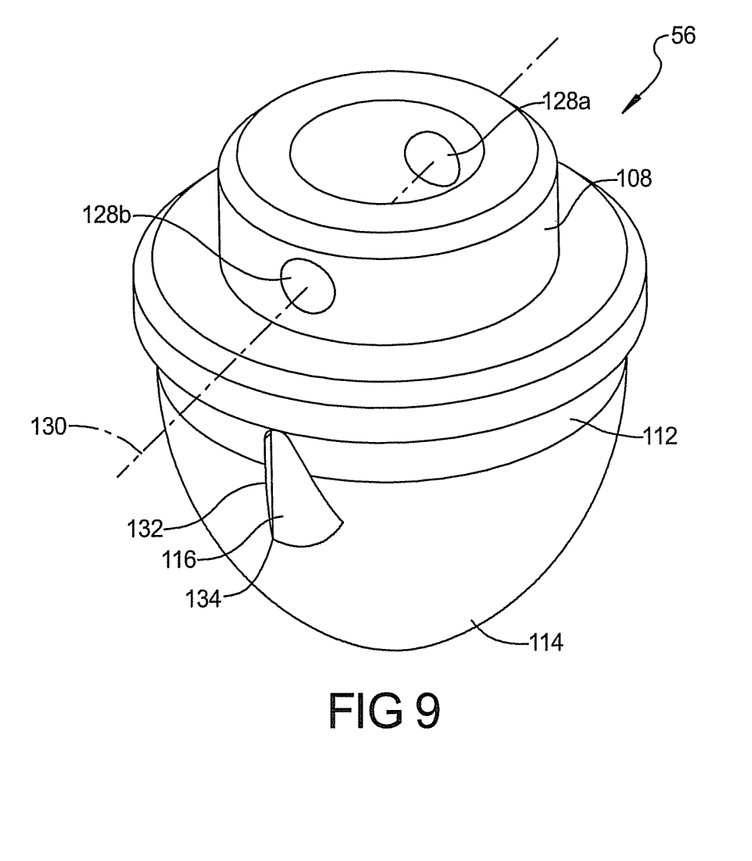
FIG. 9 is a top perspective view of a valve disc of the present disclosure.

Referring to FIG. 9, valve disc 56 additionally includes first and second pin receiving apertures 128a, 128b which are both co-axially aligned on a pin/aperture longitudinal axis 130 extending through disc connection portion 108. The first disc slot 116 as well as the second disc slot 126 (not visible in this view) each include a slot side wall 132 which initially begins in the disc columnar portion 112 and ends at a side wall tangent point 134 positioned along the disc curved portion 114. A length and height of slot side wall 132 affect the initial flow area and flow response of valve disc 56 upon opening of the control gas valve.

Figure 10:
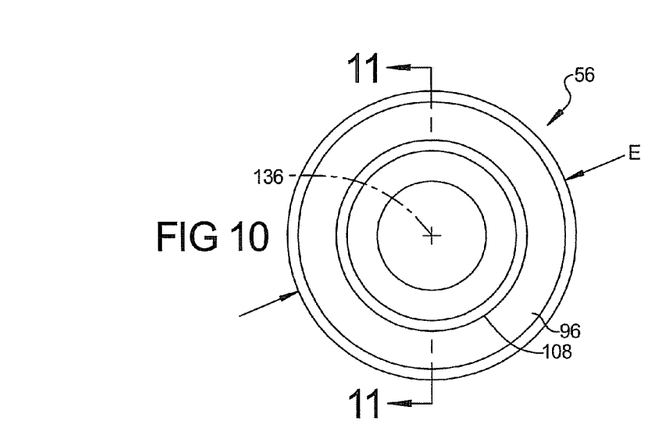
FIG. 10 is a top plan view of the valve disc of FIG. 9.

Referring to FIG. 10, each of the disc flange 96 and the disc connection portion 108 are circular in shape and are coaxially aligned with respect to a disc longitudinal axis 136. A disc flange diameter "E" defines the largest diameter of disc flange 96 and thereby defines a space envelope required for valve disc 56 to be received within tee 14 of fine control gas valve 10.

Figure 11:
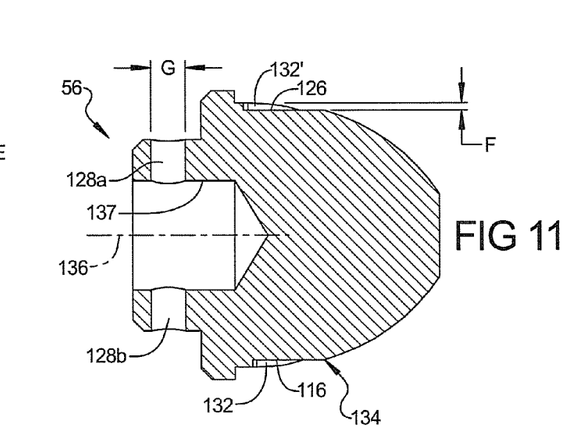
FIG. 11 is a cross sectional side elevational view taken at section 11 of FIG. 10.

Referring to FIG. 11 and again to FIG. 3, each of the first and second pin receiving apertures 128a, 128b have a common pin receiving aperture diameter "G" which is sized to slidably receive and frictionally engage disc connecting pin 58. A bore 137 is coaxially aligned on disc longitudinal axis 136 and is sized to slidably receive the drive screw second end 88. The slot side wall 132, 132' of each of the first and second disc slots 116, 126 are substantially identical and each have a side wall height "F" which when varied changes the location of side wall tangent point 134 thereby increasing or decreasing a fluid flow area of first and second disc slots 116, 126 and therefore increases or decreases a fluid flow rate through the first and second disc slots 116, 126.

Referring to FIG. 12 and again to FIG. 3, each of first and second disc slots 116, 126 (second disc slot 126 is clearly visible in FIG. 13) are substantially pie-shaped and include a narrow width first end 138 positioned in disc columnar portion 112. The width of first and second disc slots 116, 126 continuously increases to a wide width second end 139 which defines a slot end arc tangentially interfacing with disc curved portion 114. This continuous increase in width of first and second disc slots 116, 126 provides a continuously increasing flow area for fluid passing along disc curved portion 114 as valve disc 56 moves away from a seated position defining the closed condition. The portion of first and second disc slots 116, 126 having the smallest width and area is located in disc columnar portion 112 whose diameter "D" is substantially equal to the inner diameter inlet pipe 16. Therefore, initial fluid flow past valve disc 56 will be through the narrow width first end 138. Flow gradually increases in a finely controllable manner through tee branch 42 as valve disc 56 opens due to an increased flow area created by the increasing exposed area of first and second disc slots 116, 126 as wider width second end 139 moves with respect to pipe end face/seat surface 94. Valve flow rate thereafter continues to increase due to a continuously increasing flow area due to disc curved portion 114 continuously decreasing in diameter as it transitions away from pipe end face/seat surface 94 and disc columnar portion 112.

Figure 12:
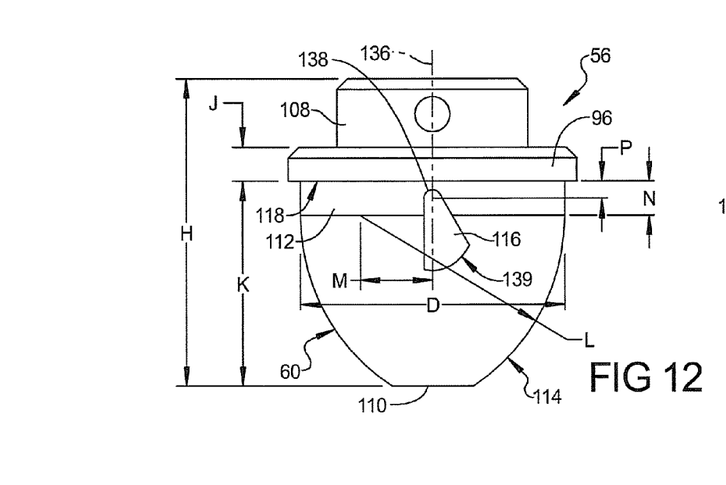
FIG. 12 is a front elevational view of the valve disc of FIG. 9.

A total disc length "H" of valve disc 56 includes a flange thickness "J" of disc flange 96, a height or length of disc connection portion 108, and a flow control surface length "K" of disc flow control surface 60. A flow control surface radius of curvature "L" of disc curved portion 114 is determined from a tangent point at the junction between disc columnar portion 112 and disc curved portion 114, located at a radius end point location dimension "M" with respect to a reference line which is parallel to the disc longitudinal axis 136. A columnar portion length "N" and a slot radius locating dimension "P" are both determined with respect to the disc flange seat contact surface 118. The following dimensions are provided for exemplary purposes defining an exemplary embodiment of a two-inch valve disc 56. According to several embodiments, total disc length "H" can be 5.71 cm (2.25 in), flange thickness "J" can be 0.63 cm (0.25 in), flow control surface length "K" can be 3.81 cm (1.50 in), flow control surface radius of curvature "L" can be 3.81 cm (1.50 in), radius end point location dimension "M" can be 1.35 cm (0.53 in), columnar portion length "N" can be 0.64 cm (0.25 in), and slot radius locating dimension "P" can be 0.32 cm (0.126 in). These dimensions apply with respect to a two-inch valve disc 56 having a sealing diameter "D" of 4.93 cm (1.940 in). Any of these dimensions can be changed at the discretion of the manufacturer to modify the flow results identified in the flow curve shown and described in reference to FIG. 14.

Figure 13:
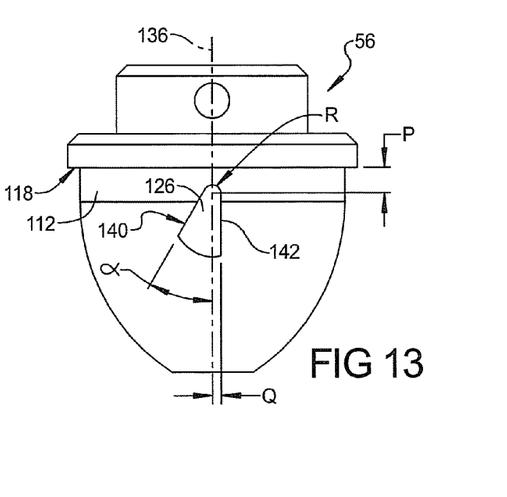
FIG. 13 is a rear elevational view of the valve disc of FIG. 9.

Referring to FIG. 13, second disc slot 126 is oppositely directed with respect to first disc slot 116 and is therefore substantially a mirror image of first disc slot 116. Each of the first and second disc slots 116, 126 include a first side wall edge 140 and a second side wall edge 142 which are oriented at an angle α with respect to each other. According to several embodiments for a two-inch valve disc 56 angle α is approximately 30 degrees. The second side wall edge 142 is located at a second slot wall location dimension "Q" with respect to a reference line oriented parallel to disc longitudinal axis 136. A slot end radius "R" for each of the first and second disc slots 116, 126 is located with respect to a slot radius locating dimension "P". According to several embodiments with respect to the exemplary two-inch valve disc 56, slot radius locating dimension "P" is approximately 0.48 cm (0.189 in), second slot wall locating dimension "Q" is 0.16 cm (0.063 in), and slot end radius "R" is 0.16 cm (0.063 in).

Referring to FIG. 14, a graph 144 provides a first axis 146 delineating a quantity of complete open turns of an exemplary 2 inch drive screw 54 of control gas valve 10 versus a similar sized 2 inch commercial gate valve. A second axis 148 delineates a flow rate in cubic feet per minute of control gas valve 10 versus the similar sized commercial gate valve at each of the various open turn positions. A flow rate per open turn curve 150 demonstrates that fine control gas valve 10 provides a more linear flow curve with respect to the number of open turns of control gas valve 10 compared to a flow rate per open turn curve 152 for the comparably sized two-inch gate valve. Fine control gas (FCG) valve 10 provides improved flow rate control particularly between 1 and 4 open turns compared to the 2 inch gate valve, providing the user greater capability to throttle gas or fluid flow at lower flow rates. By direct comparison, fine control gas valve 10 provides throttling flow control over a 22 CFM range varying from 1 open turn (approximately 8 CFM) to 4 open turns (approximately 30 CFM). In contrast, the 2 inch gate valve provides substantially no throttling capability, ranging approximately 127 CFM between 1 open turn (approximately 8 CFM) and 4 open turns (approximately 135 CFM). One advantage of control gas valve 10 is therefore provided in the ability to finely control the flow rate at a lower open turn range of the valve when used in compressible gas service.

With continuing reference to FIGS. 1-13, fine flow control valve 10 can be operated as follows. With the valve disc 56 initially in a valve closed condition, disc flange seat contact surface 118 of disc flange 96 is in contact with second portion 94b of pipe end face/seat surface 94, and disc columnar portion 112 is substantially in sliding contact with the sealing diameter "D" portion of inlet pipe insertion portion 90. Upon rotation of hand operator 20 in a counterclockwise opening direction indicated by directional arrow 34, drive screw 54 axially rotates such that threaded portion 72 engaged with threaded bore 76 causes a corresponding longitudinal displacement of valve disc 56 in the valve opening direction "B". This results in disc flange seat contact surface 118 of disc flange 96 displacing away from contact with second portion 94b of pipe end face/seat surface 94. Valve disc 56 displaces in the valve opening direction "B" until the narrow width first end 138 of both first and second disc slots 116, 126 passes second portion 94b of pipe end face/seat surface 94, creating a fluid flow path for a fluid (such as a gas) in valve inlet port 98 to escape past disc columnar portion 112 and second portion 94b of pipe end face/seat surface 94 via a path through first and second disc slots 116, 126 an out through the narrow width first end 138 and exiting through valve outlet port 100.

With increasing longitudinal displacement of valve disc 56 in the valve opening direction "B", a rate of discharge flow increases gradually as more of the width (and therefore more of an area) of first and second disc slots 116, 126 is exposed with respect to second portion 94b of pipe end face/seat surface 94. When the tangential junction between disc columnar portion 112 and the disc curved portion 114 passes second portion 94b of pipe end face/seat surface 94, the curvature of disc curved portion 114 plus the increasing width (and therefore the area) of first and second disc slots 116, 126 permits substantially greater discharge flow through valve outlet port 100. The effect of first and second disc slots 116, 126 on valve flow rate is diminished substantially to zero after wider width second ends 139 pass second portion 94b of pipe end face/seat surface 94 during valve disc travel in the valve opening direction "B". Valve discharge flow rate thereafter continues to increase as the diameter of disc curved portion 114 continues to decrease with respect to sealing diameter "D" during valve disc travel in the valve opening direction "B". Valve disc 56 can be continually longitudinally displaced until disc flange 96 contacts body portion end face 83 of cylindrical body portion 78 of indicator sleeve 24 establishing the valve fully open condition. Fine flow control valve 10 can then be returned from the valve open condition to the valve closed condition, or any operating position therebetween, by an opposite (clockwise) rotation of hand operator 20.

The position of valve disc 56 is indirectly visually indicated by the position of sleeve end face 50 of cover sleeve 18 with respect to any of the individual ones of the valve position indicators 36 and position indicator values 48. The operator can consult one of a plurality of graphs 144, an example of one presented in FIG. 14, to set a position of fine control gas valve 10 for a desired flow rate based on a predetermined number of valve turns. Multiple versions of graphs 144 can be provided, for example to define operating conditions for different types of gases, different gas pressures, gas temperature/density differences, valve size, and the like.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fine control gas valve, comprising:
    a tee having opposed first and second tee runs co-axially aligned on a longitudinal axis, and a tee branch oriented perpendicular to the longitudinal axis;
    a valve assembly partially received in and connected to the first tee run, the valve assembly having a valve disc connected to a drive screw and longitudinally moved by axial rotation of the drive screw;

a pie-shaped first disc slot created in the valve disc having a first side wall edge and a second side wall edge, the second side wall edge oriented at an angle with respect to the first side wall edge and defining a reference line oriented parallel to and offset from a disc longitudinal axis, a width of the first disc slot continuously increasing to a wide width second end which defines a slot end arc; and a pipe received in the second tee run having a first portion of a pipe end face/seat surface in direct contact with a shoulder created in a wall of the second tee run and extending inwardly from the wall, the valve disc when contacting a second portion of the pipe end face/seat surface defining a valve closed condition, the first and second portions of the pipe end face/seat surface being co-planar to each other.

2. The fine control gas valve of claim 1, wherein the valve disc includes a disc flange having a disc flange seat contact surface oriented parallel to the second portion of the pipe end face/seat surface and in direct contact with the pipe end face/seat surface in the valve closed condition.

3. The fine control gas valve of claim 2, wherein the valve disc further includes:
   a disc columnar portion having a diameter smaller than a diameter of the disc flange, the disc columnar portion oriented perpendicular to the disc flange seat; and
   a disc curved portion tangentially extending from the disc columnar portion and continuously decreasing in diameter toward a disc free end, the disc free end oriented parallel with respect to the disc flange seat.

4. The fine control gas valve of claim 1, wherein the valve disc further includes:
   a disc columnar portion oriented perpendicular to a disc flange;
   a continuously decreasing diameter disc curved portion tangentially extending from the disc columnar portion and oppositely directed from the disc flange; and
   the first disc slot having a first end positioned in the disc columnar portion and extending to a second end wider than the first end and positioned in the disc curved portion such that the widest portion of the second end at the slot end arc defines a closest portion of the first disc slot to a disc free end.

5. The fine control gas valve of claim 4, further including a second disc slot defining a mirror image of the first disc slot and positioned 180 degrees about the valve disc with respect to the first disc slot.

6. The fine control gas valve of claim 1, wherein the valve disc further includes a first disc slot having a first end and a second end wider than the first end.

7. The fine control gas valve of claim 6, further including a second disc slot defining a mirror image of the first disc slot and positioned 180 degrees about the valve disc with respect to the first disc slot.

8. The fine control gas valve of claim 1, further including:
   an indicator sleeve having a cylindrical body portion received in the first tee run and fixed to the first tee run; and
   a portion of the cylindrical body portion having a threaded bore threadably receiving threads of the drive screw.

9. The fine control gas valve of claim 8, wherein the valve assembly includes a hand operator connected to the drive screw such that rotation of the hand operator both co-rotates and longitudinally displaces the drive screw and the valve disc.

10. The fine control gas valve of claim 8, wherein the valve assembly includes:
   a tubular cover sleeve connected to the drive screw rotated and longitudinally displaced by rotation of the drive screw; and
   multiple valve position indicators on an outer surface of the cylindrical body portion, wherein longitudinal displacement of the tubular cover sleeve exposes successive ones of the valve position indicators thereby indicating an operating position of the valve disc.

11. The fine control gas valve of claim 1, wherein a valve open condition is created when the valve disc is displaced away from contact with the second portion of the pipe end face/seat surface permitting flow of a fluid from the second tee run to pass the second portion of the pipe end face/seat surface and through the tee branch.

12. A fine control gas valve, comprising:
   a tee having opposed first and second tee runs co-axially aligned on a longitudinally axis, and a tee branch oriented perpendicular to the longitudinal axis;
   a valve assembly partially received in and connected to the first tee run, the valve assembly having a valve disc connected to a drive screw and longitudinally moved by axial rotation of the drive screw, the valve disc including:
      a disc columnar portion oriented perpendicular to a disc flange;
      a disc curved portion tangentially extending from the disc columnar portion and oppositely directed from the disc flange; and
      a first disc slot having a first end positioned in the disc columnar portion and extending to a second end positioned in the disc curved portion, the second end of the first disc slot defining a slot end arc tangentially interfacing with the disc curved portion.

13. The fine control gas valve of claim 12, wherein the first disc slot includes first and second side wall edges oriented at an angle with respect to each other.

14. The fine control gas valve of claim 13, wherein the angle is approximately 30 degrees.

15. The fine control gas valve of claim 12, further including a second disc slot defining a mirror image of the first disc slot.

16. The fine control gas valve of claim 15, wherein the second disc slot is positioned 180 degrees about the valve disc with respect to the first disc slot.

17. The fine control gas valve of claim 12, wherein the second end of the first disc slot is wider than the first end.

18. The fine control gas valve of claim 12, wherein the first disc slot includes a slot side wall extending from the disc columnar portion into the disc curved portion, wherein a side wall height of the slot side wall determines a total area of the first disc slot.

19. A fine control gas valve, comprising:
   a tee having opposed first and second tee runs co-axially aligned on a longitudinally axis, and a tee branch oriented perpendicular to the longitudinal axis;
   a valve assembly partially received in and connected to the first tee run, the valve assembly having a valve disc connected to a drive screw and longitudinally moved by axial rotation of the drive screw, the valve disc including:
      a first slot created on the valve disc having a first end and a second end wider than the first end; and
      a second disc slot created on the valve disc in a mirror image of the first disc slot;
   a pipe received in the second tee run having first portion of a pipe end face/seat surface in direct contact with a shoulder created in a wall of the second tee run, the valve disc when contacting a second portion of the pipe end face/seat surface defining a valve closed condition, the first and second portions of the pipe end face/seat surface being co-planar to each other; and the valve assembly includes an indicator sleeve having a cylindrical body portion received in the first tee run and fixed to the first tee run by fasteners extending through the first tee run into the cylindrical body portion to fix the cylindrical body portion against rotation with respect to the tee.

20. The fine control gas valve of claim 19, wherein the indicator sleeve includes a clearance bore freely receiving a threaded portion of the drive screw.

21. The fine control gas valve of claim 20, wherein the indicator sleeve includes:
    a sleeve inner wall slidably and rotatably receiving an un-threaded portion of the drive screw; and
    a seal member positioned in a slot of the sleeve inner wall and contacting the un-threaded portion of the drive screw and oppositely positioned about the clearance bore with respect to the valve disc.

22. The fine control gas valve of claim 19, wherein the cylindrical body portion includes a threaded bore threadably receiving threads of the drive screw.

23. The fine control gas valve of claim 19, wherein the valve assembly includes:
    a tubular cover sleeve connected to the drive screw co-rotated and longitudinally displaced by rotation of the drive screw; and
    multiple valve position indicators located on an outer surface of the cylindrical body portion, wherein longitudinal displacement of the tubular cover sleeve exposes successive ones of the valve position indicators.

24. The fine control gas valve of claim 23, wherein a thread pitch of the drive screw is selected such that any complete revolution of the drive screw corresponds to a spacing between any two successive ones of the valve position indicators.

25. The fine control gas valve of claim 19, wherein the second disc slot is oppositely positioned about the valve disc with respect to the first disc slot.

26. A method to control gas flow using a fine control gas valve, the fine control gas valve having a tee with first and second tee runs and a perpendicularly oriented tee branch, and a valve assembly having a valve disc connected to a drive screw having a disc flange, the method comprising:
    connecting the valve assembly in the first tee run;
    orienting a disc columnar portion of the valve disc perpendicular to the disc flange;
    creating a disc curved portion of the valve disc tangentially extending from the disc columnar portion;
    forming a pie-shaped disc slot on the valve disc having a first end positioned in the disc columnar portion and a second end wider than the first end positioned in the disc curved portion, a width of the first disc slot continuously increasing to the second end which further defines a slot end arc; and
    axially rotating the drive screw to longitudinally displace the valve disc away from a valve closed condition having the disc flange in contact with a seat surface such that the first end of the disc slot passes the seat surface initially, followed by the second end of the disc slot passing the seat surface, thereby increasing an exposed area of the disc slot permitting increasing discharge flow from the fine control gas valve through the disc slot as the disc slot is exposed with respect to the seat surface from the first to the second end.

27. The method of claim 26, further comprising creating a second disc slot on the valve disc in a mirror image of the disc slot and oppositely positioned on the valve disc with respect to the disc slot.

* * * * *

UNITED STATES PATENT AND TRADEMARK OFFICE
CERTIFICATE OF CORRECTION

PATENT NO. : 8,800,597 B2  Page 1 of 1
APPLICATION NO. : 13/088000
DATED : August 12, 2014
INVENTOR(S) : Douglas D. Colby et al.

It is certified that error appears in the above-identified patent and that said Letters Patent is hereby corrected as shown below:

In the Specification

Column 2, Detailed Description, Line 62: - after "schedule" delete "80", therefor.

Column 6, Detailed Description, Line 44: - delete "alien" and insert --allen--, therefor.

Signed and Sealed this
Twenty-seventh Day of January, 2015

Michelle K. Lee
*Deputy Director of the United States Patent and Trademark Office*